(12) United States Patent
Heinen et al.

(10) Patent No.: US 11,719,782 B2
(45) Date of Patent: Aug. 8, 2023

(54) ONE-WAY TIME-OF-FLIGHT LOCALIZATION USING SONIC AND ELECTROMAGNETIC SIGNALS FOR MOBILE AD HOC NETWORKS

(71) Applicant: Raytheon Company, Waltham, MA (US)

(72) Inventors: Gregory W. Heinen, Tucson, AZ (US); James J. Richardson, Temecula, CA (US)

(73) Assignee: Raytheon Company, Waltham, MA (US)

(\*) Notice: Subject to any disclaimer, the term of this patent is extended or adjusted under 35 U.S.C. 154(b) by 917 days.

(21) Appl. No.: 16/525,221

(22) Filed: Jul. 29, 2019

(65) Prior Publication Data

US 2021/0033696 A1   Feb. 4, 2021

(51) Int. Cl.

| | | |
|---|---|---|
| *G01S 5/02* | (2010.01) | |
| *H04W 84/18* | (2009.01) | |
| *H04W 88/16* | (2009.01) | |
| *G01S 5/16* | (2006.01) | |
| *G01S 5/18* | (2006.01) | |
| *H04J 3/06* | (2006.01) | |

(52) U.S. Cl.
CPC ............ *G01S 5/0289* (2013.01); *H04W 84/18* (2013.01); *H04W 88/16* (2013.01); *G01S 5/16* (2013.01); *G01S 5/18* (2013.01); *H04J 3/0682* (2013.01)

(58) Field of Classification Search
CPC .......... G01S 11/16; G01S 11/12; G01S 11/14; G01S 11/00; G01S 5/18; G01S 5/16; G01S 5/30; G01S 5/02585; G01S 5/0289; H04W 84/18; H04W 88/16; H04J 3/0682
See application file for complete search history.

(56) References Cited

U.S. PATENT DOCUMENTS

| | | |
|---|---|---|
| 9,705,561 B2 | 7/2017 | Henry et al. |
| 9,787,412 B2 | 10/2017 | Henry et al. |
| 9,793,955 B2 | 10/2017 | Henry et al. |
| 9,800,327 B2 | 10/2017 | Gerszberg et al. |
| 9,831,912 B2 | 11/2017 | Henry et al. |
| 9,860,075 B1 | 1/2018 | Gerszberg et al. |
| 9,866,309 B2 | 1/2018 | Bennett et al. |

(Continued)

FOREIGN PATENT DOCUMENTS

EP    3419325 B1    11/2020

OTHER PUBLICATIONS

Shi et al., Design on Hybrid RFID & Ultrasound Based 2D Indoor Positioning System, 2013, 62 pages. (Year: 2013).*

(Continued)

*Primary Examiner* — Quoc N Vuz

(57) ABSTRACT

A method includes communicating first and second signals between a first node and a second node, where the first signal includes a sonic signal and the second signal includes an electromagnetic signal. The method also includes using the electromagnetic signal to one of start or stop a timer and using the sonic signal to another of stop or start the timer. The method further includes identifying a one-way time-of-flight associated with the sonic signal traveling between the first and second nodes using the timer. The one-way time-of-flight associated with the sonic signal is indicative of a distance between the nodes.

20 Claims, 7 Drawing Sheets

(56) References Cited

U.S. PATENT DOCUMENTS

| | | | |
|---|---|---|---|
| 9,876,264 | B2 | 1/2018 | Barnickel et al. |
| 9,893,795 | B1 | 2/2018 | Henry et al. |
| 9,904,535 | B2 | 2/2018 | Gross et al. |
| 9,913,139 | B2 | 3/2018 | Gross et al. |
| 9,935,703 | B2 | 4/2018 | Bennett et al. |
| 9,967,173 | B2 | 5/2018 | Gross et al. |
| 9,973,940 | B1 | 5/2018 | Rappaport |
| 9,999,038 | B2 | 6/2018 | Barzegar et al. |
| 10,020,844 | B2 | 7/2018 | Bogdan et al. |
| 10,027,397 | B2 | 7/2018 | Kim |
| 10,090,594 | B2 | 10/2018 | Henry et al. |
| 10,168,695 | B2 | 1/2019 | Barnickel et al. |
| 10,178,445 | B2 | 1/2019 | Lubranski et al. |
| 2006/0155508 | A1* | 7/2006 | Choi ............... G01S 5/186 702/150 |
| 2009/0231958 | A1* | 9/2009 | Wei ............... G01S 5/18 367/118 |
| 2011/0026363 | A1 | 2/2011 | Lavache |
| 2014/0160880 | A1* | 6/2014 | King ............... H04B 11/00 367/2 |
| 2015/0247916 | A1 | 9/2015 | Bartov et al. |
| 2017/0361726 | A1 | 12/2017 | Widmer et al. |
| 2018/0156616 | A1 | 6/2018 | Bennett et al. |
| 2018/0239008 | A1* | 8/2018 | Han ............... G06F 21/60 |
| 2019/0170785 | A1* | 6/2019 | Riccardi ............... G06F 3/038 |
| 2019/0181532 | A1 | 6/2019 | Vannucci et al. |

OTHER PUBLICATIONS

Office Action dated Jul. 2, 2020 in connection with U.S. Appl. No. 16/525,294, 10 pages.
Atherton, "The Army wants drones that make their own networks," Sightline Media Group, Jan. 2019, 4 pages.
"CyPhy Works aims to bring drones to agriculture, mining, public safety sectors," Boston Business Journal, Oct. 2015, 3 pages.
Guillen-Perez et al., "Flying Ad Hoc Networks: A New Domain for Network Communications," Sensors 2018, Sep. 2018, 23 pages.
"Scholar: Ranging & Localization," Humatics, Data Sheet, Mar. 2019, 1 page.
McNeil, "CyPhy Works' new drone takes off on Kickstarter," Directions Media, Jun. 2015, 3 pages.
Nandakumar et al., "3D Localization for Sub-Centimeter Sized Devices," Association for Computing Machinery, SenSys '18, Nov. 2018, 12 pages.
"UWB localization techniques—TOF and TDOA," Nanjing Woxu Wireless Co., Ltd., Apr. 2019, 3 pages.
"Ultra wideband (UWB) wireless AD hoc networks," Nanjing Woxu Wireless Co., Ltd., Apr. 2019, 3 pages.
"PARC: The Tethered Drone," Aria Insights, Specification Sheet, Version PN15534-01/D, Jan. 2019, 2 pages.
Riley, "A High-Resolution Time Interval Counter Using the TAPR TADD-2 and TICC Modules," Hamilton Technical Services, Mar. 2017, 9 pages.
"PulsON 440 Data Sheet / User Guide," Time Domain, 320-0317D, May 2017, 78 pages.
"PulsON 440 Operation Description / Theory of Operation," Time Domain, Dec. 2015, 9 pages.
"Intelligent Transportation based UWB Positioning and Connectivity," University at Albany—SUNY, Signals & Networks Lab, Apr. 2018, 34 pages.
Yavuz et al., "A new multi-tier adaptive military MANET security protocol using hybrid cryptography and signcryption," Turk J. Elec. Eng. & Comp. Sci., vol. 18, No. 1, 2010, 21 pages.
U.S. Appl. No. 16/525,240 entitled "Localization Using Repeated Transmissions of Electromagnetic Signals for Mobile Ad Hoc Networks," Jul. 29, 2019, 38 pages.
U.S. Appl. No. 16/525,294 entitled "Localization Using Signals Transmitted Over Different Signal Paths for Mobile Ad Hoc Networks," Jul. 29, 2019, 41 pages.
Office Action dated Apr. 17, 2020 in connection with U.S. Appl. No. 16/525,294, 15 pages.
International Search Report and Written Opinion of the International Searching Authority dated May 26, 2020 in connection with International Patent Application No. PCT/US2020/022978, 15 pages.
Applicant-Initiated Interview Summary dated Jun. 21, 2022 in connection with U.S. Appl. No. 16/525,240, 10 pages.
Non-Final Office Action dated Jun. 2, 2022 in connection with U.S. Appl. No. 16/525,240, 13 pages.

\* cited by examiner

ONE-WAY TIME-OF-FLIGHT LOCALIZATION USING SONIC AND ELECTROMAGNETIC SIGNALS FOR MOBILE AD HOC NETWORKS

TECHNICAL FIELD

This disclosure generally relates to communication systems. More specifically, this disclosure relates to one-way time-of-flight localization using sonic and electromagnetic signals for mobile ad hoc networks.

BACKGROUND

A mobile ad hoc network or "MANET" generally refers to a communication network in which autonomous nodes communicate wirelessly and are often able to move independently. There is typically no previously-defined infrastructure or architecture for a mobile ad hoc network. As a result, the nodes in the network can often arrange and re-arrange themselves in various ways, and the arrangement of the nodes typically varies over time.

SUMMARY

This disclosure provides one-way time-of-flight localization using sonic and electromagnetic signals for mobile ad hoc networks.

In a first embodiment, a method includes communicating first and second signals between a first node and a second node, where the first signal includes a sonic signal and the second signal includes an electromagnetic signal. The method also includes using the electromagnetic signal to one of start or stop a timer and using the sonic signal to another of stop or start the timer. The method further includes identifying a one-way time-of-flight associated with the sonic signal traveling between the first and second nodes using the timer, and the one-way time-of-flight associated with the sonic signal is indicative of a distance between the nodes.

In a second embodiment, an apparatus includes a first node, where the first node includes a transmitter, a receiver, and a controller. The transmitter is configured to transmit a first signal to a second node, where the first signal includes one of an electromagnetic signal and a sonic signal. The receiver is configured to receive a second signal from the second node, where the second signal includes the other of the electromagnetic signal and the sonic signal. The controller is configured to start a timer based on transmission of the first signal and stop the timer based on reception of the second signal. A measured time is associated with a one-way time-of-flight of the sonic signal traveling between the first and second nodes, and the one-way time-of-flight is indicative of a distance between the nodes.

In a third embodiment, an apparatus includes a first node, where the first node includes at least one transmitter configured to transmit a first signal and a second signal to a second node. The first signal includes an electromagnetic signal, and the second signal includes a sonic signal. The second node is configured to start a timer based on reception of the first signal and stop the timer based on reception of the second signal. A measured time is associated with a one-way time-of-flight of the sonic signal traveling between the first and second nodes, and the one-way time-of-flight is indicative of a distance between the nodes.

In a fourth embodiment, an apparatus includes a second node, where the second node includes at least one receiver and a controller. The at least one receiver is configured to receive a first signal and a second signal from a first node, where the first signal includes an electromagnetic signal and the second signal includes a sonic signal. The controller is configured to start a timer based on reception of the first signal and stop the timer based on reception of the second signal. A measured time is associated with a one-way time-of-flight of the sonic signal traveling between the first and second nodes, and the one-way time-of-flight is indicative of a distance between the nodes.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
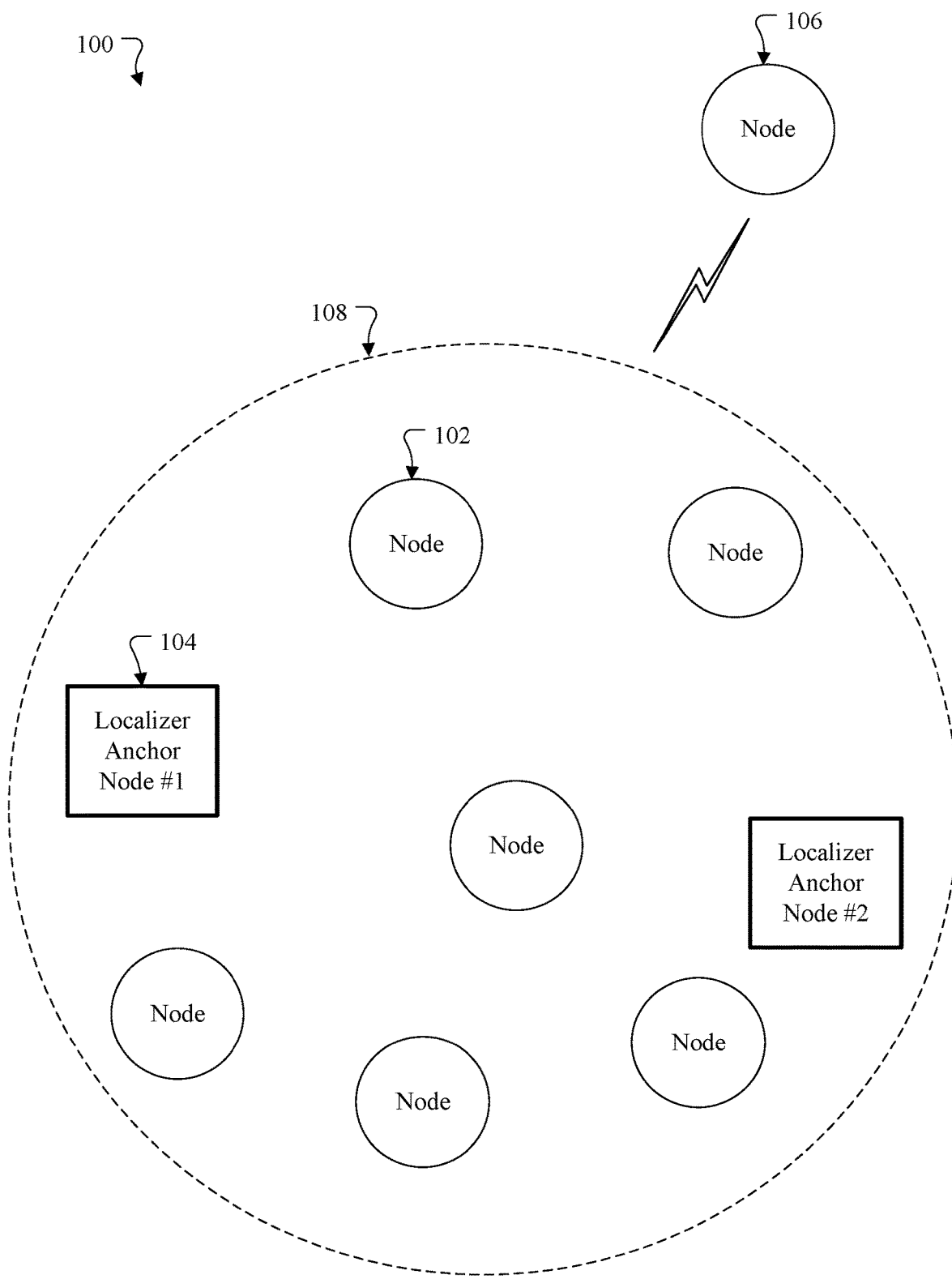
FIG. 1 illustrates an example system supporting one-way time-of-flight localization for mobile ad hoc networks in accordance with this disclosure.

FIGS. 1 through 7, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, a mobile ad hoc network (MANET) refers to a communication network in which autonomous nodes communicate wirelessly and are often able to move independently, so the arrangement of the nodes typically varies over time. In some cases, it may be necessary or desirable to operate the nodes in a mobile ad hoc network as a coherent distributed array, which means that the operations of the nodes are coherently coordinated so that the nodes perform specific operations as a single system. The ability to operate nodes in a mobile ad hoc network coherently can provide various advantages depending on the implementation and application. For example, operating the nodes in a mobile ad hoc network coherently may allow the nodes to collectively create a high-gain synthetic aperture directional antenna.

The formation of a coherent distributed but mobile array of nodes often requires both localization of the nodes and timing synchronization of the nodes. However, these functions can be difficult or costly to perform in various circumstances and for various reasons. For example, two-way time-of-flight techniques are often used in which a signal is transmitted from a first node to a second node, reflected from the second node, and received back at the first node. A distance between the nodes can then be estimated by multiplying the round-trip time of the signal by the speed of the signal and dividing the result by two.

Unfortunately, two-way time-of-flight techniques often use radio frequency (RE) or other electromagnetic signals, and these signals travel at the speed of light (approximately $2.998 \times 10^8$ meters per second) in free space. Identifying the round-trip time of a signal traveling at that speed requires the use of a very precise clock source, such as a clock source having a pica-second accuracy, which can be relatively expensive. The use of less accurate (and cheaper) clock sources may introduce large errors into the calculated distances between the nodes. Also, two-way time-of-flight techniques that rely on reflection of a signal can suffer from problems associated with low reflection area or poor reflection characteristics. Further, two-way time-of-flight techniques that rely on reflection can experience multi-path problems in which a transmitted signal is reflected from multiple objects or from an incorrect object (not just an object of interest), which can cause an erroneous distance to be calculated. In addition, two-way time-of-flight techniques often suffer from $1/r^4$ losses, where r represents the distance between the nodes. This means that an electromagnetic signal rapidly weakens as the distance between the nodes increases, which can limit the range of these techniques.

One overriding problem here is that many ranging systems involve "uncooperative" ranging since one node (often a target) does not voluntarily wish to participate in or cannot participate in ranging operations. For example, RADAR and LIDAR systems are often used for target detection, and the target may not wish to be located or to participate in ranging. As another example, laser range-finders are often used to identify distances to objects, and those objects typically cannot participate in range-finding operations (other than to passively reflect laser energy). As yet another example, sonic robotic sensors are often used to identify nearby walls or other obstacles, and those obstacles typically cannot participate in sensing operations (other than to passively reflect sonic energy).

This disclosure provides various techniques for one-way time-of-flight localization in mobile ad hoc networks. As described in more detail below, nodes are configured to engage in "cooperative" ranging in which two or more nodes cooperate to perform ranging in support of localization and optionally timing synchronization using one-way time-of-flight measurements. In some instances, a sonic signal can be transmitted from a first node to a second node, and an RF or other electromagnetic signal can be transmitted from the second node to the first node in response. In other instances, an RF or other electromagnetic signal can be transmitted from a first node to a second node, and a sonic signal can be transmitted from the second node to the first node in response. In still other instances, both an RF or other electromagnetic signal and a sonic signal can be transmitted from a first node to a second node.

In these embodiments, RF or other electromagnetic signals travel at the speed of light, while sonic signals travel at the much slower speed of sound. An electromagnetic signal can therefore travel virtually instantly between two nodes, particular those separated by relatively small distances (such as less than several hundred meters). As a result, the time required for an electromagnetic signal to pass between the nodes can be substantially or completely disregarded. Instead, the travel time of a sonic signal can be used as a time-of-flight measurement, and an RF or other electromagnetic signal can be used to identify the start or stop of the time-of-flight measurement. Because of this, only a one-way time-of-flight measurement is needed, meaning the time it takes the sonic signal to travel from the first node to the second node or from the second node to the first node is used (and not the time it takes a signal to travel from the first node to the second node and be reflected back to the first node).

These approaches allow a distance between two nodes to be calculated without requiring clock synchronization between the nodes, since the time-of-flight for a sonic signal can be determined using a single clock source at a single one of the nodes. Also, since the time-of-flight of a slower sonic signal rather than a much faster electromagnetic signal is used, a less accurate clock source can be used for time-of-flight measurements, although a higher-accuracy clock source may still be used. Further, at least one electromagnetic signal can be used to help support synchronization or re-synchronization of clock sources used in different nodes, which allows timing synchronization functionality to be incorporated into localization functionality. It should be noted, however, that this feature is optional since one node need not have a synchronized clock (or any clock for that matter) for the localization functionality described here to operate. Moreover, these approaches avoid reliance on signal reflections, helping to avoid low or poor reflection problems, $1/r^4$ losses, and multi-path problems even when nodes are used indoors. In addition, these approaches can obtain accurate position measurements (such as with centimeter or millimeter accuracy) at longer distances, enabling nodes to be arranged in a coherent array and support desired functionality. As a particular example, these techniques may allow nodes in a mobile ad hoc network to be configured to function as a large synthetic aperture antenna for beamforming and to provide fast steeling, high gain, and high azimuthal precision.

FIG. 1 illustrates an example system 100 supporting one-way time-of-flight localization for mobile ad hoc networks in accordance with this disclosure. As shown in FIG. 1, the system 100 generally includes various mobile or other communication nodes 102 and one or more anchor nodes 104. Each communication node 102 generally represents a node that can communicate with the one or more anchor nodes 104 (either uni-directionally or bi-directionally) and that can be localized through interactions with the anchor nodes 104. Each communication node 102 may optionally also engage in wireless communications with at least one more-distant node 106. For example, as described in more detail below, the communication nodes 102 may be operated coherently to provide beamforming or other coherent operations involving the more-distant nodes 106.

At least some of the communication nodes 102 are mobile, which means that the layout of the communication nodes 102 may vary over time. In order to support localization, the communication nodes 102 are configured to engage in various communications with the anchor nodes 104 in order to help localize the communication nodes 102. This allows at least some of the nodes 102, 104 to identify the locations of the communication nodes 102 with relatively high accuracy. The same communications or different communications may also optionally be used to support timing synchronization of the communication nodes 102, such as relative to a clock source used by one or more anchor nodes 104. Each of the communication nodes 102 includes any suitable structure configured to engage in wireless communications with other devices and to engage in communications to support localization and optionally timing synchronization as described in more detail below.

Each anchor node 104 generally represents a node that can communicate with one or more communication nodes 102 and possibly with other anchor nodes 104 to help localize and optionally synchronize the communication nodes 102, such as to support coherent operation of the communication nodes 102. As described in more detail below, sonic signals and electromagnetic signals are communicated between the communication nodes 102 and the anchor nodes 104 to support one-way time-of-flight calculations. In this document, a "sonic" signal generally refers to a sound wave, which typically has a frequency of about 20 Hz to about 20 kHz for human-audible signals and a frequency of about 20 kHz to several gigahertz for ultrasonic signals. Also, in this document, an "electromagnetic" signal generally refers to an electromagnetic field propagating through space, typically at the speed of light in free space. Depending on the implementation, an electromagnetic signal may include radio waves, microwaves, infrared light, visible light, ultraviolet light, or other electromagnetic radiation.

In some embodiments, each anchor node 104 may have a fixed position during operation of the communication nodes 102. The anchor nodes 104 in these embodiments may still be portable to some degree, but the anchor nodes 104 may maintain fixed positions during operation of the communication nodes 102. In other embodiments, each anchor node 104 may not have a fixed position during operation of the communication nodes 102. As a result, these anchor nodes 104 may move during operation of the communication nodes 102, which may be permissible if, for example, each anchor node 104 can repeatedly localize the communication nodes 102. In any of these embodiments, each anchor node 104 may include a suitable subsystem for accurately identifying its own location, such as a Global Positioning System (GPS) receiver or other Global Navigation Satellite System (GLASS) receiver. Each of the anchor nodes 104 includes any suitable structure configured to engage in wireless communications with other devices and to localize and optionally synchronize at least some of those other devices as described in more detail below.

Each node 106 represents any suitable device that communicates with at least one of the communication nodes 102 or anchor nodes 104. For example, a node 106 may represent a distant or covert receiver designed to receive beamformed transmissions from communication nodes 102 that are acting as a coherent beamforming system. Note that while a single node 106 is shown here, the system 100 may include any suitable number of nodes 106, and each node 106 may have any suitable position relative to the other nodes 102, 104 of the system 100.

The nodes 102, 104, 106 here can use any suitable signals to communicate with one another. For example, in some embodiments, at least some of the nodes 102, 104, 106 may use RF signals in the high frequency (HF) band (generally about 3 MHz to about 30 MHz), in the very high frequency (VHF) band (generally about 30 MHz to about 300 MHz), or in the ultra-high frequency (UHF) band (generally about 300 MHz to about 3 GHz), although other frequencies or frequency bands may also be used. As described below, the localization functionality provided in the system 100 may be used to resolve the positions of the communication nodes 102 with very high accuracy, such as with centimeter or millimeter accuracy, in some embodiments, each communication node 102 can be localized to at least one-tenth of the wavelength used by the communication node 102 for communications, including wavelengths used for HF, VHF, or UHF communications. Thus, for instance, a node 102 communicating at a 73-centimeter wavelength in the UHF band may be localized with an accuracy of about 7.3 centimeters or less. Note, however, that the localization approaches described in this patent document may obtain accuracies much better than one-tenth of the wavelength used for communications, depending on the wavelength.

There are various ways in which the system 100 may be implemented or deployed, depending on the application or use case. For example, in some embodiments, the communication nodes 102 may represent devices carried by personnel (such as in or on their clothing, backpacks, or helmets) or on ground vehicles in a given area, and the anchor nodes 104 may represent devices carried by other personnel, devices carried on other ground vehicles, or devices situated in other ground-based locations. In other embodiments, the communication nodes 102 may represent devices carried on drones, unmanned aerial systems (UASs), or other flight vehicles, and the anchor nodes 104 may represent devices carried on ground vehicles or devices situated in ground-based locations. As a particular example, the communication nodes 102 may be implemented using drones that can achieve an altitude of about four hundred feet to about one thousand feet or more, and one or more anchor nodes 104 may be used on the ground. These approaches allow the system 100 to be used to form high-gain ground or aerial ad hoc networks that can be used for various purposes, such as capturing sensor measurements or other information over the local horizon. Note that these operations may occur continuously or on-demand, such as when drones are launched into the air to capture information and then returned to the ground once the desired information has been obtained. The ability to localize and synchronize multiple communication nodes 102 using one or more anchor nodes 104 may find use in a number of other implementations, as well.

The ability to organize the communication nodes 102 (and possibly the anchor nodes 104 if they participate) into a coherent array 108 can provide various benefits or advantages depending on the implementation. For example, a coherent array 108 may function to provide a large single antenna gain, which allows the resulting antenna formed using the nodes to transmit or receive signals at longer distances. As another example, a coherent array 108 may be harder to jam and therefore provide more resilient or reliable operation. As yet another example, a coherent array 108 may be used for azimuth scanning.

This functionality can therefore benefit its users in various ways. For example, this functionality can be used to help provide improved communication capabilities for first responders, armed forces personnel, or other personnel. This functionality can also be used to help improve ground-to-air communications between personnel on the ground and assets in the air. This functionality can further be used to help provide improved stand-off capabilities for personnel, such as when the system 100 can be used to help identify threats earlier or at larger distances. Moreover, this functionality can be used to help organize drone swarms in order to perform functions like "station keeping," where the drones are organized in a specific way and try to maintain that organization during flight. Beyond that, this functionality may be used to improve the operations of automated facilities (such as driver-less automated warehouses) or autonomous vehicles (such as driver-less passenger vehicles, buses, or other vehicles). In addition to these functional or operational benefits, the localization functionality described in this patent document can be achieved at significantly lower costs compared to conventional approaches such as ultra-wideband (UWB) localization. Various approaches for implementing the localization functionality (and optionally the synchronization functionality) to help form coherent arrays or perform other functions are described in more detail below.

Although FIG. 1 illustrates one example of a system 100 supporting one-way time-of-flight localization for mobile ad hoc networks, various changes may be made to FIG. 1. For example, the system 100 may include any suitable numbers and arrangements of nodes 102, 104, 106. As particular examples, three anchor nodes 104 may be used to localize communication nodes 102 in two-dimensional (2D) space and optionally to synchronize the nodes, and four anchor nodes 104 may be used to localize communication nodes 102 in three-dimensional (3D) space and optionally to synchronize the nodes. Also, the specific arrangement of the communication nodes 102 shown in FIG. 1 can vary overtime, and the communication nodes 102 may assume specific arrangements to support desired operations (such as relatively straight lines or generally circular or semi-circular arrangements).

FIGS. 2A through 2D illustrate example communications supporting one-way time-of-flight localization for mobile ad hoc networks in accordance with this disclosure. In particular, FIGS. 2A through 2D illustrate example ways in which sonic and electromagnetic signals may be used to support one-way time-of-flight localization for mobile ad hoc networks. For ease of explanation, the communications shown in FIGS. 2A through 2D are described as being used in the system 100 of FIG. 1. However, the communications shown in FIGS. 2A through 2D may be used in any other suitable system.

Figure 2A:
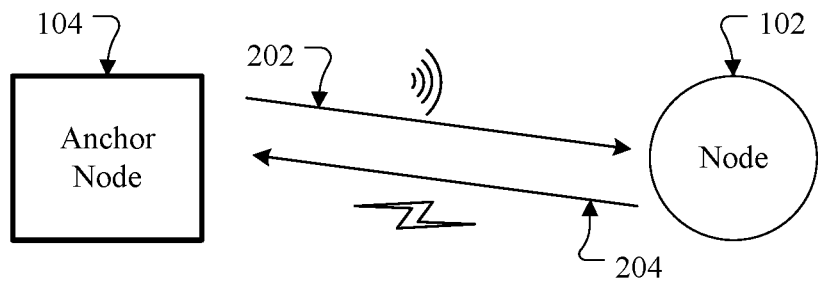
FIGS. 2A through 2D illustrate example communications supporting one-way time-of-flight localization for mobile ad hoc networks in accordance with this disclosure.

As shown in FIG. 2A, an anchor node 104 transmits a sonic signal 202 (such as an audible or ultrasonic signal) to a communication node 102 as a trigger signal. When the communication node 102 receives and detects the sonic signal 202, the communication node 102 transmits an electromagnetic signal 204 (such as an RF signal) back to the anchor node 104 as a response signal. The sonic signal 202 travels at the speed of sound. As a result, there is an easily-measurable delay between transmission of the sonic signal 202 by the anchor node 104 and receipt of the sonic signal 202 by the communication node 102, even when the range between the nodes 102, 104 is relatively small. In contrast, the electromagnetic signal 204 travels at the speed of light, so there is virtually no delay between transmission of the electromagnetic signal 204 by the communication node 102 and receipt of the electromagnetic signal 204 by the anchor node 104.

Given these signals 202 and 204, the anchor node 104 may start a timer upon transmission of the sonic signal 202 to the communication node 102, and the anchor node 104 may stop the timer upon reception of the electromagnetic signal 204 from the communication node 102. Given the relatively slow speed of the sonic signal 202 and the extremely fast speed of the electromagnetic signal 204, the time as measured by the timer of the anchor node 104 is reflective of the one-way time-of-flight for the sonic signal 202 to travel from the anchor node 104 to the communication node 102. The time as measured by the timer of the anchor node 104 also includes any processing time of the communication node 102 (such as to receive and detect the sonic signal 202 and to generate and transmit the electromagnetic signal 204) and possibly any processing time of the anchor node 104 (such as to receive and detect the electromagnetic signal 204). However, these processing times can typically be designed or determined by simple calibration with suitable accuracy to allow adjustment of the time as measured by the timer of the anchor node 104 in order to identify the actual one-way time-of-flight of the sonic signal 202. The actual one-way time-of-flight can then be multiplied by the speed of the sonic signal 202 in order to identify the distance between the nodes 102, 104.

Figure 2B:
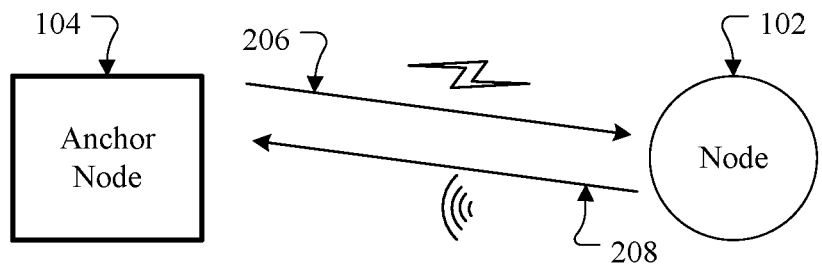

As shown in FIG. 2B, the anchor node 104 transmits an electromagnetic signal 206 (such as an RF signal) to the communication node 102 as a trigger signal. When the communication node 102 receives and detects the electromagnetic signal 206, the communication node 102 transmits a sonic signal 208 (such as an audible or ultrasonic signal) back to the anchor node 104 as a response signal. Given these signals 206 and 208, the anchor node 104 may start a timer upon transmission of the electromagnetic signal 206 to the communication node 102, and the anchor node 104 may stop the timer upon reception of the sonic signal 208 from the communication node 102. The time as measured by the timer of the anchor node 104 is reflective of the one-way time-of-flight for the sonic signal 208 to travel from the communication node 102 to the anchor node 104. Once adjusted for any processing time of the communication node 102 and possibly any processing time of the anchor node 104, the adjusted time identifies the actual time-of-flight for the sonic signal 208. Again, the actual one-way time-of-flight can then be multiplied by the speed of the sonic signal 208 in order to identify the distance between the nodes 102, 104.

Figure 2C:
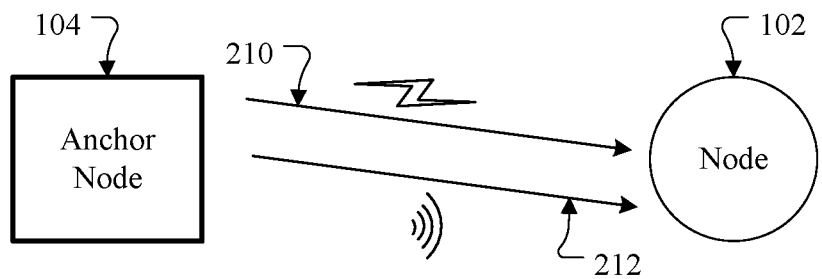

As shown in FIG. 2C, the anchor node 104 simultaneously transmits an electromagnetic signal 210 (such as an RF signal) and a sonic signal 212 (such as an audible or ultrasonic signal) to the communication node 102. Given these signals 210 and 212, the communication node 102 may start a timer upon reception of the electromagnetic signal 210 from the anchor node 104, and the communication node 102 may stop the timer upon reception of the sonic signal 212 from the anchor node 104 (thus identifying a time-difference-of-arrival or "TDOA" of the signals 210 and 212). The time as measured by the timer of the communication node 102 is reflective of the one-way time-of-flight for the sonic signal 212 to travel from the anchor node 104 to the communication node 102. Once adjusted for any processing time of the communication node 102, the adjusted time identifies the actual time-of-flight for the sonic signal 212. Again, the actual one-way time-of-flight can then be multiplied by the speed of the sonic signal 212 in order to identify the distance between the nodes 102, 104.

It should be noted here that while the signals 210 and 212 are described as being simultaneously transmitted, it is also possible to transmit the signals 210 and 212 with a known offset, where this offset can be subtracted from the timer measurement. Also, it should be noted that, in this example, the communication node 102 may be implemented or operate as a passive receiver here since no signals are being transmitted by the communication node 102 (at least for ranging or localization purposes). This may allow the communication node 102 to operate covertly while still being able to localize itself with respect to the at least one anchor node 104.

Figure 2D:
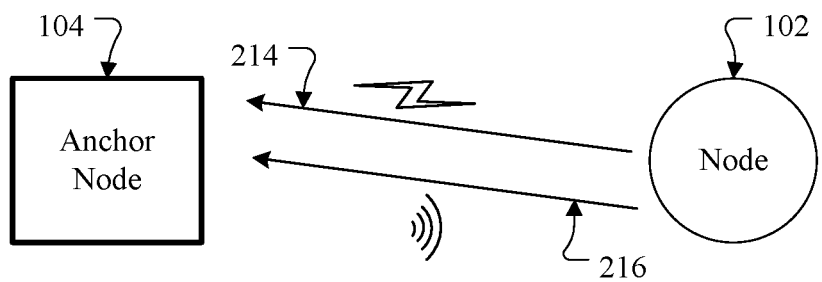

FIG. 2D illustrates a similar approach, except the communication node 102 simultaneously (or with a known offset) transmits an electromagnetic signal 214 (such as an RF signal) and a sonic signal 216 (such as an audible or ultrasonic signal) to the anchor node 104. Given these signals 214 and 216, the anchor node 104 may start a timer upon reception of the electromagnetic signal 214 from the communication node 102, and the anchor node 104 may stop the timer upon reception of the sonic signal 216 from the communication node 102. The time as measured by the timer of the anchor node 104 is reflective of the one-way time-of-flight for the sonic signal 216 to travel from the communication node 102 to the anchor node 104. Once adjusted for any processing time of the anchor node 104, the adjusted time identifies the actual time-of-flight for the sonic signal 216. Again, the actual one-way time-of-flight can then be multiplied by the speed of the sonic signal 216 in order to identify the distance between the nodes 102, 104.

As can be seen here, there are various ways in which sonic and electromagnetic signals can be used to support one-way time-of-flight measurements associated with a distance between multiple nodes. One advantage of these approaches is that clock sources in the two nodes 102, 104 do not need to be synchronized, and the clock source in only one of the two nodes 102, 104 may be used to measure a time-of-flight. That is, only one of the nodes 102, 104 may need to measure a period of time, such as between transmission of one signal and receipt of another signal (FIGS. 2A and 2B) or between receipt of two signals (FIGS. 2C and 2D), in order to capture a time-of-flight measurement. The other node need not have a synchronized clock source (or any clock source at all) in order for these functions to occur successfully.

Note that the sonic signal 202, 208, 212, 216 may have any suitable form. In some embodiments, the sonic signal 202, 208, 212, 216 may represent a set of sonic pukes having a desired or pre-defined pattern or other waveform that is recognizable to the receiving node. Also, in some embodiments, the sonic signal 202, 208, 212, 216 may be encoded with data, such as a coded acoustic pulse or other identifier of the node transmitting the sonic signal or other data. Also note that the electromagnetic signal 204, 206, 210, 214 may be encoded with data, such as an identifier of the node transmitting the electromagnetic signal and/or location data (like a known location of the node transmitting the electromagnetic signal). The use of encoded data in the sonic signal and/or the electromagnetic signal may allow, for instance, an anchor node 104 to differentiate between different responses received from different communication nodes 102 or an anchor node 104 to inform a communication node 102 of its approximate position or to provide any other desired data to the communication node 102. Further, note that a single anchor node 104 may communicate with multiple communication nodes 102 and/or a single communication node 102 may communicate with multiple anchor nodes 104 during different localization operations. In order to support this, communications (whether sonic or electromagnetic) may be encoded, such as with specific device identifiers, in order to control which node responds to a trigger signal or to identify which node transmits a response signal, in addition, an anchor node 104 may communicate with different communication nodes 102 sequentially (or vice versa), or different nodes 102, 104 may have different known programmed delays in order to respond to a trigger signal with a response signal at a precise time or to ensure a specific total processing duration.

Although FIGS. 2A through 2D illustrate examples of communications supporting one-way time-of-flight localization for mobile ad hoc networks, various changes may be made to FIGS. 2A through 2D. For example, any other suitable communication schemes may be used involving sonic and electromagnetic signals to assist with one-way time-of-flight calculations. Also, multiple communications may occur between two nodes 102, 104 in order to identify multiple one-way time-of-flight measurements or distances, which can then be averaged or otherwise processed to identify a final one-way time-of-flight measurement or distance.

Figure 3:
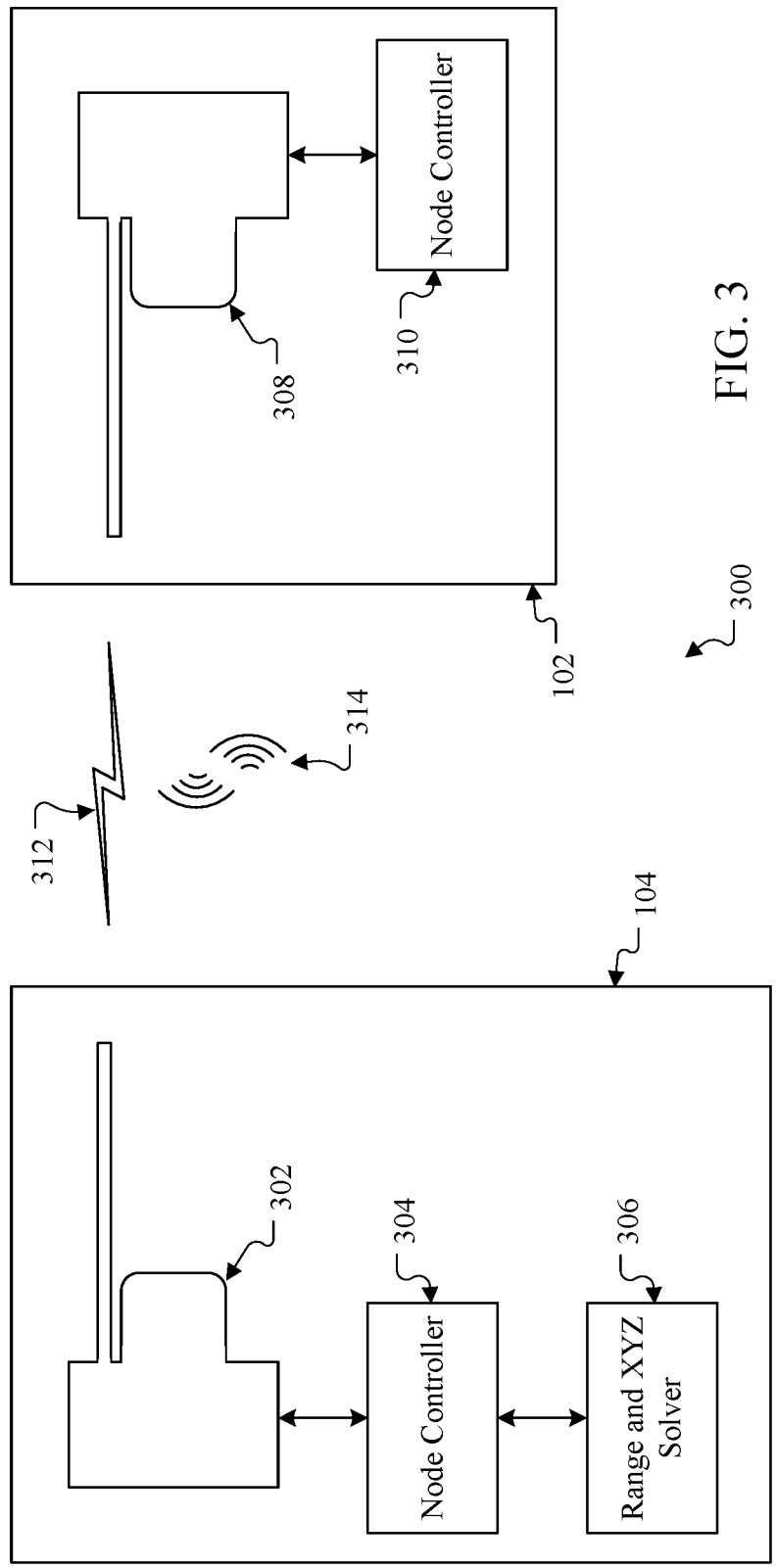
FIG. 3 illustrates an example architecture for devices supporting one-way time-of-flight localization for mobile ad hoc networks in accordance with this disclosure.

FIG. 3 illustrates an example architecture 300 for devices supporting one-way time-of-flight localization for mobile ad hoc networks in accordance with this disclosure. In particular, the architecture 300 in FIG. 3 shows an example implementation of an anchor node 104 and an example implementation of a communication node 102. For ease of explanation, the architecture 300 of FIG. 3 is described as being used in the system 100 of FIG. 1 along with one of the communication schemes shown in FIGS. 2A through 2D. However, the architecture 300 of FIG. 3 may be used in any other suitable system and with any other suitable communication scheme.

As shown in FIG. 3, the anchor node 104 includes an electromagnetic trigger and sonic ranger 302, a node controller 304, and a range and XYZ solver 306. Also as shown in FIG. 3, the communication node 102 includes an electromagnetic receiver and sonic ranger 308 and a node controller 310. The electromagnetic trigger and sonic ranger 302 generally operates to produce an electromagnetic signal 312 (such as an RF signal) that is transmitted to the communication node 102 and to receive a sonic signal 314 (such as an ultrasonic signal) transmitted by the communication node 102. Conversely, the electromagnetic receiver and sonic ranger 308 generally operates to receive the electromagnetic signal 312 that is transmitted by the anchor node 104 and to transmit the sonic signal 314 to the anchor node 104. Note, however, that other embodiments of the nodes 102, 104 can be used, such as when the anchor node 104 transmits the sonic signal 314 and receives the electromagnetic signal 312 or when one of the communication node 102 or the anchor node 104 transmits both the electromagnetic signal 312 and the sonic signal 314.

The electromagnetic trigger and sonic ranger 302 includes any suitable structure configured to generate an electromagnetic signal and detect a sonic signal. The electromagnetic receiver and sonic ranger 308 includes any suitable structure configured to receive an electromagnetic signal and generate a sonic signal. As particular examples, the electromagnetic trigger and sonic ranger 302 may include an RF generator and antenna along with an ARDUINO HC-SR04 ultrasonic sensor or a DEVANTECH SRF10 ultrasonic range-finder, and the electromagnetic receiver and sonic ranger 308 may include an RF receiver and antenna along with an ARDUINO HC-SR04 ultrasonic sensor or a DEVANTECH SRF10 ultrasonic range-finder. Note that while the HC-SR04 ultrasonic sensor and the DEVANTECH SRF10 ultrasonic range-finder both include an ultrasonic transmitter and an ultrasonic receiver, each node 102, 104 here may only need to use one of the ultrasonic transmitter or the ultrasonic receiver (but not both). Once again, note that the node(s) containing the transmitter(s) that generate(s) the electromagnetic signal 312 and the sonic signal 314 and the node(s) containing the receiver(s) that receive(s) the electromagnetic signal 312 and the sonic signal 314 can vary.

The node controller 304 of the anchor node 104 controls the transmission and reception of signals by the electromagnetic trigger and sonic ranger 302 and can perform functions related to localization of the communication node 102. For example, in some embodiments, the node controller 304 may trigger the transmission of the sonic signal 314, start a timer, and stop the timer upon reception of the electromagnetic signal 312. In other embodiments, the node controller 304 may trigger the transmission of the electromagnetic signal 312, start a timer, and stop the timer upon reception of the sonic signal 314. In yet other embodiments, the node controller 304 may trigger the transmission of the electromagnetic signal 312 and the sonic signal 314 (simultaneous or with a known offset) and optionally receive a time-difference-of-arrival measurement or other measurement from the communication node 102. In still other embodiments, the node controller 304 may start a timer upon reception of the electromagnetic signal 312 and stop the timer upon reception of the sonic signal 314. However obtained, the node controller 304 may also process the measured time, such as by subtracting any processing time associated with the anchor node 104 and/or the communication node 102, to identify an actual time-of-flight of the sonic signal 314.

The node controller 310 of the communication node 102 controls the transmission and reception of signals by the electromagnetic receiver and sonic ranger 308 and can perform functions related localization of the communication node 102. For example, in some embodiments, the node controller 310 may detect reception of the sonic signal 314 and trigger transmission of the electromagnetic signal 312. In other embodiments, the node controller 310 may detect reception of the electromagnetic signal 312 and trigger transmission of the sonic signal 314. In yet other embodiments, the node controller 310 may start a timer upon reception of the electromagnetic signal 312, stop the timer upon reception of the sonic signal 314, determine a time-difference-of-arrival of the signals 312 and 314, and use or transmit the measurement. In still other embodiments, the node controller 310 may trigger the transmission of the electromagnetic signal 312 and the sonic signal 314 (simultaneous or with a known offset) to the anchor node 104.

Each node controller 304, 310 includes any suitable structure configured to control various aspects of a node's operation, including the transmission and/or reception of at least one electromagnetic signal 312 and at least one sonic signal 314. For example, each node controller 304, 310 may include one or more microprocessors, microcontrollers, digital signal processors (DSPs), field programmable gate arrays (FPGAs), application specific integrated circuits (ASICs), or discrete circuitry. As a particular example, each node controller 304, 310 may be implemented using an ARDUINO UNO microcontroller board. Note that the specific functions performed by each node controller 304, 310 can vary based on a number of factors, including whether the node being controlled is transmitting both an electromagnetic signal 312 and a sonic signal 314, receiving both the electromagnetic signal 312 and the sonic signal 314, or transmitting one of and receiving the other of the electromagnetic signal 312 and the sonic signal 314.

The range and XYZ solver 306 generally operates to process one or more one-way time-of-flight measurements in order to help localize one or more communication nodes 102. For example, the range and XYZ solver 306 may use a one-way time-of-flight measurement and a speed of a sonic signal 314 to estimate a distance (range) to a communication node 102. The range and XYZ solver 306 may also use multiple distances (such as distances calculated by multiple anchor nodes 104 and provided to the range and XYZ solver 306 or distances calculated by the range and XYZ solver 306 based on times-of-flight from multiple anchor nodes 104) to identify a location of the communication node 102, such as in 2D or 3D space. Distance measurements may be provided between the anchor nodes 104 in any suitable manner, such as via RF or other communications (and possibly via one or more of the communication nodes 102). The range and XYZ solver 306 may also use an angle of arrival (such as one determined using an antenna array) in combination with a measured distance to identify the location of the communication node 102. In general, any suitable technique may be used to localize at least one communication node 102 based on one or more one-way time-of-flight measurements.

The range and XYZ solver 306 includes any suitable structure configured to process one-way time-of-flight measurements to identify a range and a position of at least one communication node 102. For example, the range and XYZ solver 306 may include one or more processing devices, such as one or more microprocessors, microcontrollers, DSPs, FPGAs, ASICs, or discrete circuitry. As a particular example, the range and XYZ solver 306 may include or implement a tracking extended Kalman filter (EKF) to process sonic-based time-of-flight measurements, which can help to improve the accuracy of the distance/position estimates related to the communication node 102. Note that while the range and XYZ solver 306 is shown here as being a separate component from the node controller 304, these components 304 and 306 may be combined into a single functional unit. Also note that the range and XYZ solver 306 may be implemented outside of an anchor node 104, such as when the anchor node 104 provides data (like time-of-flight measurements) to an external component for processing.

Although FIG. 3 illustrates one example of an architecture 300 for devices supporting one-way time-of-flight localization for mobile ad hoc networks, various changes may be made to FIG. 3. For example, various components shown in FIG. 3 may be combined, further subdivided, rearranged, or omitted and additional components can be added according to particular needs. As a particular example, the component 302 may be implemented using an electromagnetic transmitter or receiver and a separate sonic transmitter or receiver, and the component 308 may be implemented using an electromagnetic transmitter or receiver and a separate sonic transmitter or receiver.

Figure 4:
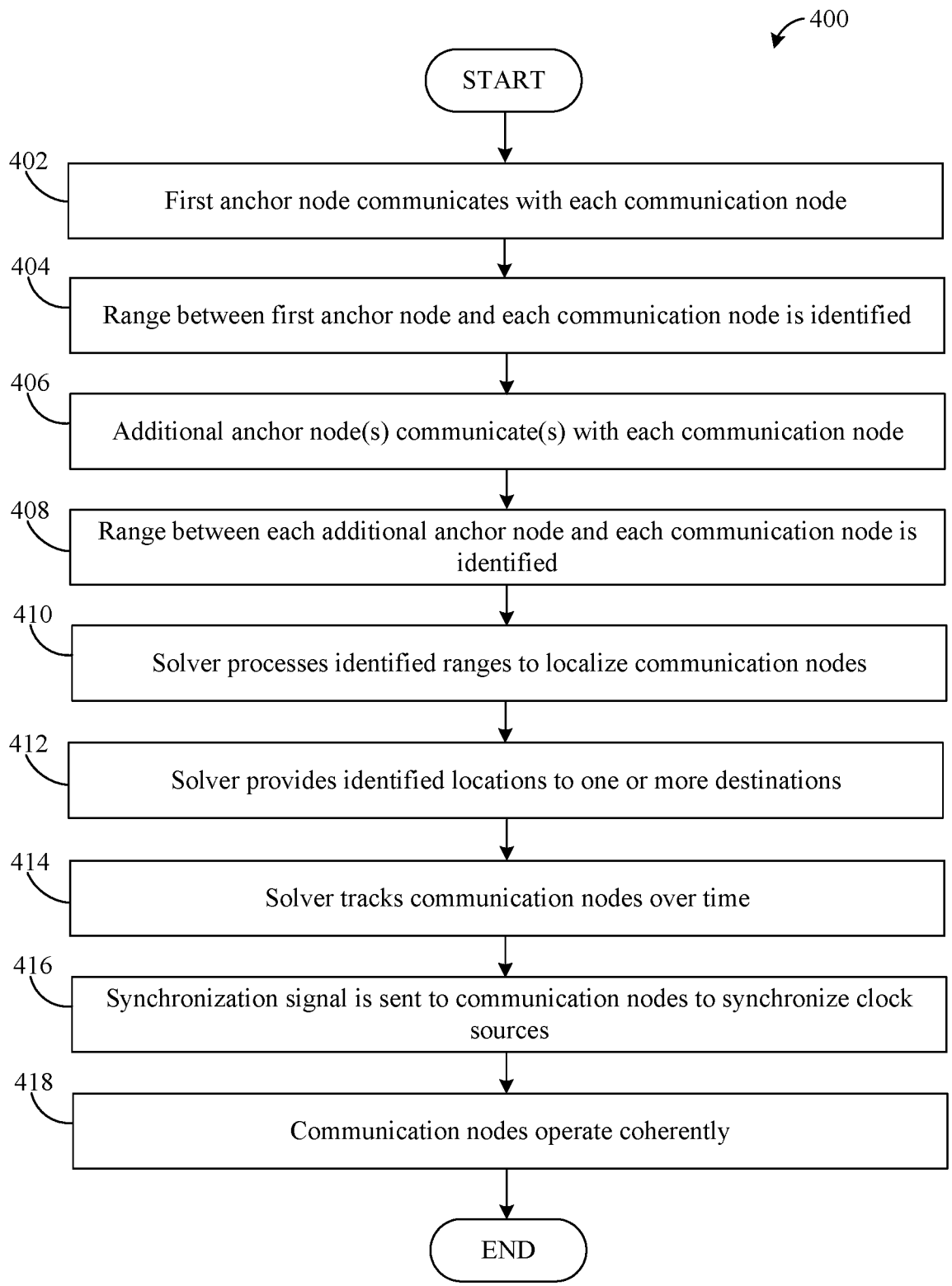
FIG. 4 illustrates an example method for localization in mobile ad hoc networks in accordance with this disclosure.

FIG. 4 illustrates an example method 400 for localization in mobile ad hoc networks in accordance with this disclosure. For ease of explanation, the method 400 may be described as involving the communication and anchor nodes 102, 104 of FIG. 1 supporting any of the communication schemes and techniques shown in FIGS. 2A through 2D. However, the method 400 may involve the use of any other suitable nodes and any communication schemes and techniques implemented according to the teachings of this disclosure.

As shown in FIG. 4, a first anchor node communicates with each of one or more communication nodes at step 402, and a range between the first anchor node and each communication node is identified at step 404. This may include, for example, the first anchor node 104 and each communication node 102 exchanging sonic and electromagnetic signals (which may occur once or multiple times). This may also include the first anchor node 104 or each communication node 102 measuring a one-way time-of-flight. The range between the first anchor node 104 and each communication node 102 is based on the associated one-way time-of-flight. Optionally, one or more additional anchor nodes may communicate with each of the one or more communication nodes at step 406, and a range between each additional anchor node and each communication node may be identified at step 408. These steps may occur in the same or similar manner as steps 402 and 404. Steps 406 and 408 are optional since, depending on the implementation, there may be a single anchor node 104 used with the one or more communication nodes 102.

A solver processes the identified ranges to localize each communication node at step 410. This may include, for example, a range and XYZ solver 306 obtaining one or more identified ranges from one or more anchor nodes 104 (although the solver 306 may form a part of at least one of the anchor nodes 104). This may also include the solver 306 using the identified range(s) and the known location(s) of one or more anchor nodes 104 to identify the location of each communication node 102 (such as via multilateration or other suitable technique). Various localization techniques are known in the art, and others are sure to be developed in the future. Standard localization techniques based on two-way time-of-flight calculations may be used here, except the two-way time-of-flight measurements can be replaced by the one-way time-of-flight techniques disclosed in this patent document.

Once the one or more communication nodes 102 have been localized, the location(s) of the communication node(s) 102 may be used in any suitable manner. For instance, the identified locations may be provided to one or more destinations at step 412, such as when the solver transmits the identified locations to the communication nodes 102, anchor nodes 104, or other nodes. This may allow, for example, the communication nodes 102 to alter their positions in order to obtain desired positions or a desired layout. The solver can track the location(s) of the communication node(s) over time at step 414. This may include, for example, the solver using extended Kalman filter tracking to improve the localization of each communication node 102 as time progresses. A synchronization signal can be sent to the one or more communication nodes in order to synchronize the clock source(s) of the communication node(s) at step 416. This may include, for example, an anchor node 104 or other device transmitting an RF or other electromagnetic signal to the communication nodes 102 in order to synchronize the clocks of the communication nodes 102. In addition, multiple communication nodes may operate in a coherent manner to provide desired functionality at step 418. This may include, for example, the communication nodes 102 operating to provide beamforming or to function as a high-gain synthetic aperture directional antenna.

Although FIG. 4 illustrates one example of a method 400 for localization in mobile ad hoc networks, various changes may be made to FIG. 4. For example, while shown as a series of steps, various steps in FIG. 4 may overlap, occur in parallel, occur in a different order, occur any number of times, or be omitted. As a particular example, the RF or other electromagnetic signal used for synchronization in step 416 may represent one of the electromagnetic signals transmitted during localization operations in one or more of steps 402-408. As another example, one or more locations of one or more nodes may be used in any other suitable manner, and this disclosure is not limited to using multiple nodes coherently based on the localization.

Figure 5:
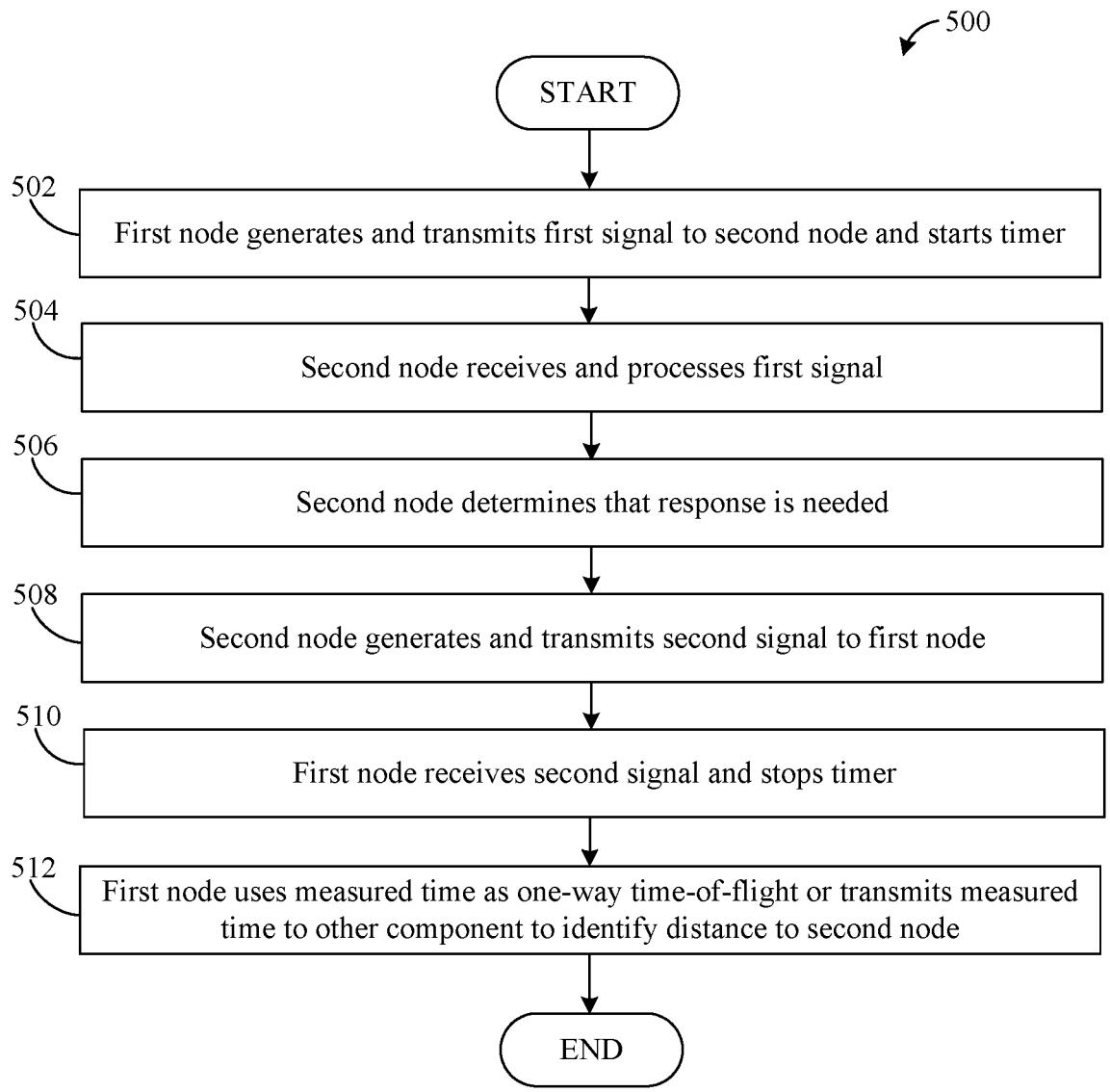
FIGS. 5 and 6 illustrate example methods for one-way time-of-flight localization in mobile ad hoc networks in accordance with this disclosure.
Figure 6:
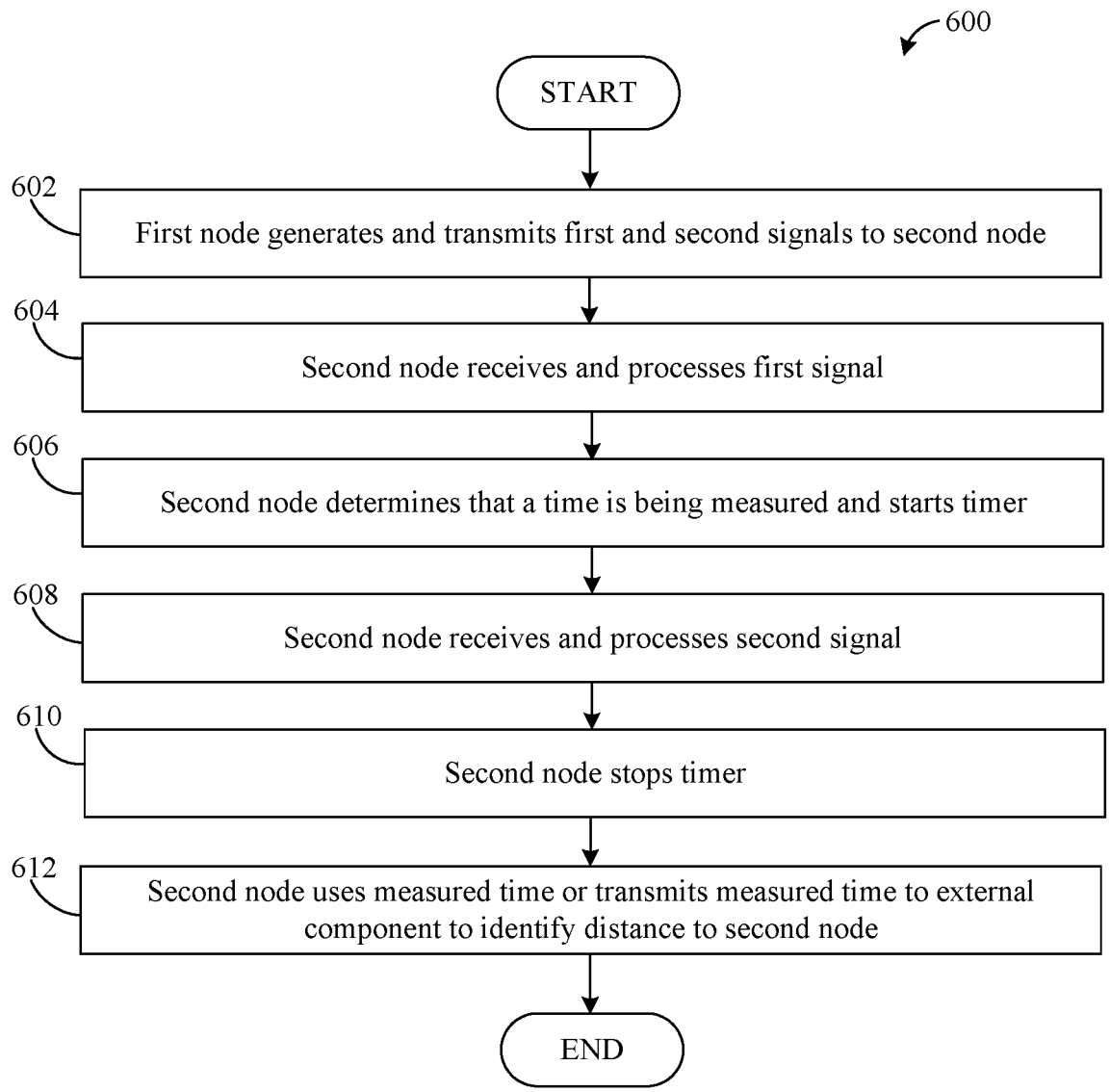

FIGS. 5 and 6 illustrate example methods 500 and 600 for one-way time-of-flight localization in mobile ad hoc networks in accordance with this disclosure. In particular, FIGS. 5 and 6 illustrate example methods 500 and 600 for using sonic and electromagnetic signals to identify a range between two nodes (such as an anchor node 104 and a communication node 102). Either of the methods 500 and 600 may, for instance, be used in steps 402-404 and optionally steps 406-408 in the method 400 of FIG. 4. For ease of explanation, the methods 500 and 600 may be described as involving the communication and anchor nodes 102, 104 of FIG. 1 supporting any of the communication schemes and techniques shown in FIGS. 2A through 2D. However, the methods 500 and 600 may involve the use of any other suitable nodes.

As shown in FIG. 5, a first node generates and transmits a first signal to a second node and starts a timer at step 502. This may include, for example, the node controller 304 of the first node 102, 104 causing the electromagnetic trigger and sonic ranger 302 of the first node 102, 104 to transmit an electromagnetic signal 312. This may also include the node controller 304 of the first node 102, 104 starting a timer when the electromagnetic signal 312 is transmitted. As noted above, the first node that is generating the electromagnetic signal 312 may represent an anchor node 104 or a communication node 102.

A second node receives and processes the first signal at step 504 and determines that a response is needed at step 506. This may include, for example, the electromagnetic trigger and sonic ranger 302 of the second node 104, 102 receiving the electromagnetic signal 312. This may also include the node controller 304 of the second node 104, 102 determining that a response is needed based on data encoded in the received signal 312 or based simply on the receipt of a specified signal 312. The second node generates and transmits a second signal to the first node at step 508. This may include, for example, the node controller 304 of the second node 104, 102 causing the electromagnetic trigger and sonic ranger 302 of the second node 104, 102 to transmit a sonic signal 314. As noted above, the second node that is generating the sonic signal 314 may represent a communication node 102 or an anchor node 104.

The first node receives the second signal and stops the timer at step 510. This may include, for example, the electromagnetic trigger and sonic ranger 302 of the first node 102, 104 receiving the sonic signal 314 and the node controller 304 of the first node 102, 104 stopping the timer when the sonic signal 314 is received. The first node uses the measured time as a one-way time-of-flight to identify a distance to the second node, or the first node transmits the measured time to another component that uses the measured time as a one-way time-of-flight to identify the distance to the second node at step 512. This may include, for example, the node controller 304 of the first node 102, 104 using the measured time to localize the second node 104, 102 with respect to the first node 102, 104 or providing the measured time to the range and XYZ solver 306, which localizes the second node 104, 102 with respect to the first node 102, 104. The measured time can also be pre-processed, such as by subtracting the estimated processing time of the second node 104, 102 (for receiving and detecting the electromagnetic signal 312) and possibly any processing time of the first node 102, 104 (for receiving and detecting the sonic signal 314).

Note that in the discussion of FIG. 5 here, it is assumed that the first node generates and transmits the electromagnetic signal 312 and that the second node generates and transmits the sonic signal 314. However, as noted above, the reverse may also occur. That is, the first node may generate and transmit the sonic signal 314, and the second node may generate and transmit the electromagnetic signal 312.

As shown in FIG. 6, a first node generates and transmits a first signal and a second signal to a second node at step 602. This may include, for example, the node controller 304 of the first node 102, 104 causing the electromagnetic trigger and sonic ranger 302 of the first node 102, 104 to transmit an electromagnetic signal 312 and a sonic signal 314. As noted above, the first node that is generating the electromagnetic signal 312 and the sonic signal 314 may represent an anchor node 104 or a communication node 102.

The second node receives and processes the first signal at step 604 and determines that a time is being measured and starts a timer at step 606. This may include, for example, the electromagnetic trigger and sonic ranger 302 of the second node 104, 102 receiving the electromagnetic signal 312. This may also include the node controller 304 of the second node 104, 102 determining that a time is being measured based on data encoded in the received signal 312 or based simply on the receipt of a specified signal 312 and, in response, starting a timer. The second node receives and processes the second signal at step 608 and stops the timer at step 610. This may include, for example, the electromagnetic trigger and sonic ranger 302 of the second node 104, 102 receiving the sonic signal 314 and stopping the timer when the sonic signal 314 is received. As noted above, the second node that is receiving the electromagnetic signal 312 and the sonic signal 314 may represent a communication node 102 or an anchor node 104.

The second node uses the measured time as a one-way time-of-flight to identify a distance to the first node, or the second node transmits the measured time to another component that uses the measured time as a one-way time-of-flight to identify the distance to the first node at step 512. This may include, for example, the node controller 304 of the second node 104, 102 using the measured time to localize the first node 102, 104 with respect to the second node 104, 102 or providing the measured time to the range and XYZ solver 306, which localizes the first node 102, 104 with respect to the second node 104, 102. The measured time can also be pre-processed, such as by subtracting the estimated processing time of the second node 104, 102 (for receiving and detecting the electromagnetic signal 312).

Although FIGS. 5 and 6 illustrate examples of methods 500 and 600 for one-way time-of-flight localization in mobile ad hoc networks, various changes may be made to FIGS. 5 and 6. For example, while shown as a series of steps, various steps in each figure may overlap, occur in parallel, occur in a different order, occur any number of times, or be omitted. Also, the processes shown in FIGS. 5 and 6 may occur repeatedly so that the results can be averaged, such as by identifying and averaging multiple one-way times-of-flight or distances. In addition, each determined one-way time-of-flight or distance may be used in any suitable manner.

Figure 7:
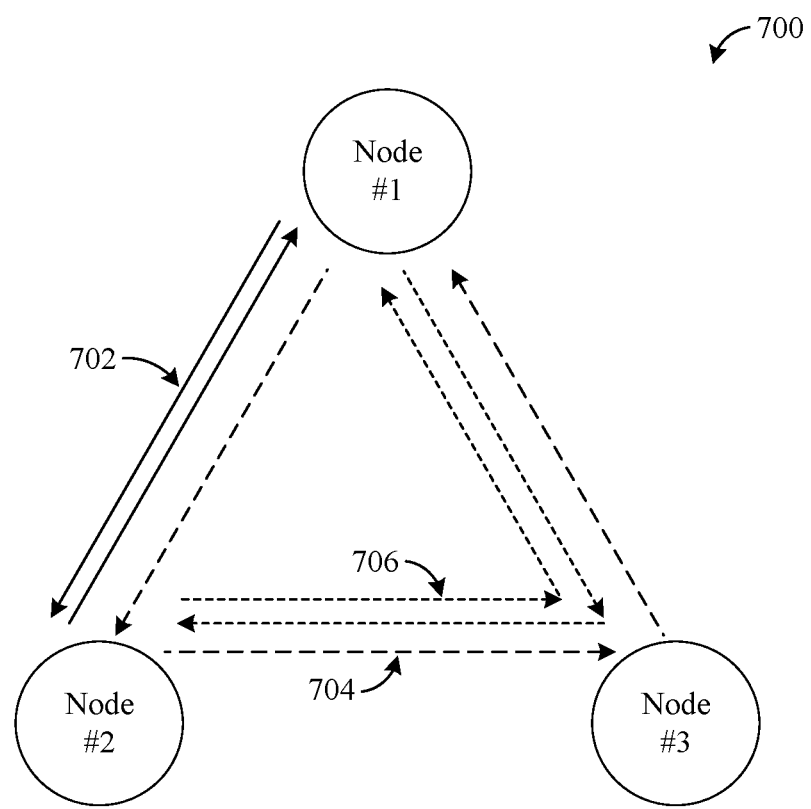
FIG. 7 illustrates an example technique for identifying a time delay associated with a node in a mobile ad hoc network in accordance with this disclosure.

FIG. 7 illustrates an example technique 700 for identifying a time delay associated with a node in a mobile ad hoc network in accordance with this disclosure. For ease of explanation, the technique 700 shown in FIG. 7 is described as being used in the system 100 of FIG. 1. However, the technique 700 shown in FIG. 7 may be used in any other suitable system.

As noted above, the processing time needed by a node 102 or 104 to receive and detect a signal (and possibly generate and transmit a response signal) can be designed or determined in order to subtract that processing time from a time measurement generated by a timer. This is done in order to generate an accurate one-way time-of-flight measurement. While it is often possible during manufacturing to place two nodes a known distance apart and transmit signals back-and-forth between the nodes to identify each node's processing time delay, this may not always be adequate. For instance, the time delay measured in a factory can drift over time or as environmental conditions change, which subsequently causes time or distance measurements to drift. As a particular example, extreme temperatures may cause processing times of nodes to vary.

As shown in FIG. 7, the technique 700 disclosed here can be used with three nodes denoted Node #1, Node #2, and Node #3. During a first set of communications 702, Node #1 transmits a signal to Node #2, and Node #2 responds by transmitting a signal back to Node #1. The amount of time between transmission of the signal to Node #2 and the reception of the signal from Node #2 can be measured at Node #1, such as with a timer of a node controller 304, 310. This time may be denoted $T_{121}$. Note that these communications 702 may occur once, or the communications 702 may occur multiple times, such as in a back and forth fashion, so that multiple time measurements can be averaged to identify the time $T_{121}$.

During a second set of communication 704, Node #1 transmits a signal to Node 42, Node #2 responds by transmitting a signal to Node #3, and Node #3 responds by transmitting a signal to Node #1. The amount of time between transmission of the signal to Node #2 and the reception of the signal from Node #3 can be measured at Node #1, such as with the timer of the node controller 304, 310. This time may be denoted $T_{1231}$. Note that these communications 704 may occur once, or the communications 704 may occur multiple times so that multiple time measurements can be averaged to identify the time $T_{1231}$.

During a third set of communication 706, Node #1 transmits a signal to Node #3, Node #3 responds by transmitting a signal to Node #2, Node #2 responds by transmitting a signal to Node #3, and Node #3 responds by transmitting a signal to Node #1. The amount of time between transmission of the signal to Node #3 and the reception of the signal from Node #3 can be measured at Node #1, such as with the timer of the node controller 304, 310. This time may be denoted $T_{13231}$. Note that these communications 706 may occur once, or the communications 706 may occur multiple times so that multiple time measurements can be averaged to identify the time $T_{13231}$.

Assuming all three nodes experience substantially the same processing time delay, the processing time associated with each node can be calculated using a formula of:

$$T_d = 2T_{1231} - T_{13231} - T_{121}$$

where $T_d$ represents the processing time delay common to all three nodes. Note that it is routine for multiple nodes to perform the same processing and number of calculations (even when some calculations are unnecessary or redundant) so that the nodes have substantially the same processing time delay. If nodes are not designed to perform the same processing and number of calculations, other techniques involving transmissions among the nodes may be used to identify the processing time delay of each node.

Note that the technique 700 shown in FIG. 7 can be repeated any number of times during operation of the nodes. For example, the processing time delays of the nodes may be determined continuously or repeatedly during operation of the nodes in order to account for drifts or other changes in the processing time delays of the nodes. This helps to increase the accuracy of the localization operations described above. The determined time delays here can be used by one or more communication nodes 102, one or more anchor nodes 104, the range and XYZ solver 306, or other component(s) to identify ranges between the nodes 102, 104.

Although FIG. 7 illustrates one example of a technique 700 for identifying a time delay associated with a node in a mobile ad hoc network, various changes may be made to FIG. 7. For example, any other suitable techniques may be used to identify processing time delays associated with nodes, including the use of one or more preprogrammed or other predefined processing time delays.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. A method comprising:
communicating first and second signals between a first node and a second node, the first signal comprising a sonic signal, the second signal comprising an electromagnetic signal, the sonic signal encoded with data identifying a transmitter of the sonic signal;
using the electromagnetic signal to one of start or stop a timer and using the sonic signal to another of stop or start the timer; and
identifying a one-way time-of-flight associated with the sonic signal traveling between the first and second nodes using the timer;
wherein the one-way time-of-flight associated with the sonic signal is indicative of a distance between the nodes; and
wherein the first node and the second node form part of a coherent array of nodes in which operations of the first node and the second node are coordinated or synchronized to perform a system function based on the distance between the nodes, the system function involving that involve, multiple nodes in different locations.

2. The method of claim 1, wherein:
the first signal is transmitted from the first node to the second node;
the second signal is transmitted from the second node to the first node in response to reception of the first signal at the second node; and
the timer is used at the first node to identify a time period between transmission of the first signal from the first node and reception of the second signal at the first node.

3. The method of claim 1, wherein:
the second signal is transmitted from the first node to the second node;
the first signal is transmitted from the second node to the first node in response to reception of the second signal at the second node; and
the timer is used at the first node to identify a time period between transmission of the second signal from the first node and reception of the first signal at the first node.

4. The method of claim 1, wherein:
the first and second signals are transmitted from the first node to the second node; and
the timer is used at the second node to identify a time period between reception of the first signal at the second node and reception of the second signal at the second node.

5. The method of claim 1, further comprising:
repeatedly identifying a processing time delay associated with one or more of the nodes based on multiple time measurements, the multiple time measurements associated with different transmissions of signals between at least three nodes.

6. The method of claim 1, further comprising:
identifying a position of the first node or the second node based on the distance between the nodes.

7. The method of claim 1, further comprising:
identifying multiple distances between multiple pairs of nodes;
synchronizing clocks of at least some of the nodes; and
coherently operating the at least some of the nodes.

8. The method of claim 1, further comprising:
synchronizing clocks of the first and second nodes using the electromagnetic signal.

9. An apparatus comprising:
a first node comprising:
- a transmitter configured to transmit a first signal to a second node, the first signal comprising one of an electromagnetic signal and a sonic signal;
- a receiver configured to receive a second signal from the second node, the second signal comprising the other of the electromagnetic signal and the sonic signal, the sonic signal encoded with data identifying a transmitter of the sonic signal; and
- a controller configured to start a timer based on transmission of the first signal and stop the timer based on reception of the second signal;
wherein a measured time is associated with a one-way time-of-flight of the sonic signal traveling between the first and second nodes;
wherein the one-way time-of-flight is indicative of a distance between the nodes; and
wherein the first node is configured to form part of a coherent array of nodes in which operations of the first node and the second node are coordinated or synchronized to perform a system function based on the distance between the nodes, the system function involving multiple nodes in different locations.

10. The apparatus of claim 9, wherein the controller is further configured to repeatedly identify a processing time delay associated with one or more of the nodes based on multiple time measurements, the multiple time measurements associated with different transmissions of signals between at least three nodes.

11. The apparatus of claim 9, further comprising a solver configured to identify a position of the first node or the second node based on the distance between the nodes.

12. The apparatus of claim 9, further comprising a solver configured to:
obtain multiple distances between multiple pairs of nodes;
synchronize clocks of at least some of the nodes; and
coherently operate at least some of the nodes.

13. A system comprising:
multiple nodes including a first node and a second node;
wherein the first node comprises at least one transmitter configured to transmit a first signal and a second signal to the second node;
wherein the first signal comprises an electromagnetic signal;
wherein the second signal comprises a sonic signal, the sonic signal encoded with data identifying the first node;
wherein the second node is configured to start a timer based on reception of the first signal and stop the timer based on reception of the second signal;
wherein a measured time is associated with a one-way time-of-flight of the sonic signal traveling between the first and second nodes;
wherein the one-way time-of-flight is indicative of a distance between the nodes; and
wherein the multiple nodes are configured to form part of a coherent array of nodes in which operations of the multiple nodes are coordinated or synchronized to perform a system function based on the distance between the nodes, the system function involving the multiple nodes in different locations.

14. The system of claim 13, wherein at least one of the first node and the second node is further configured to repeatedly identify a processing time delay associated with one or more of the nodes based on multiple time measurements, the multiple time measurements associated with different transmissions of signals between at least three nodes.

15. The system of claim 13, further comprising a solver configured to identify a position of the first node or the second node based on the distance between the nodes.

16. The system of claim 13, further comprising a solver configured to:
obtain multiple distances between multiple pairs of nodes;
synchronize clocks of at least some of the nodes; and
coherently operate at least some of the nodes.

17. An apparatus comprising:
a second node comprising:
- at least one receiver configured to receive a first signal and a second signal from a first node, the first signal comprising an electromagnetic signal, the second signal comprising a sonic signal, the sonic signal encoded with data identifying the first node; and
- a controller configured to start a timer based on reception of the first signal and stop the timer based on reception of the second signal;
wherein a measured time is associated with a one-way time-of-flight of the sonic signal traveling between the first and second nodes;
wherein the one-way time-of-flight is indicative of a distance between the nodes; and
wherein the second node is configured to form part of a coherent array of nodes in which operations of the first node and the second node are coordinated or synchronized to perform a system function based on the distance between the nodes, the system function involving multiple nodes in different locations.

18. The apparatus of claim 17, wherein the controller is further configured to repeatedly identify a processing time delay associated with one or more of the nodes based on multiple time measurements, the multiple time measurements associated with different transmissions of signals between at least three nodes.

19. The apparatus of claim 17, further comprising a solver configured to identify a position of the first node or the second node based on the distance between the nodes.

20. The apparatus of claim 17, further comprising a solver configured to:
obtain multiple distances between multiple pairs of nodes;
synchronize clocks of at least some of the nodes; and
coherently operate at least some of the nodes.

* * * * *